Jan. 11, 1944.　　　B. BOULOGNE ET AL　　　2,338,897
MEANS FOR REDUCING THE SLANTING TO SIDES
OF PNEUMATICALLY SUPPORTED VEHICLES
Filed Oct. 12, 1940　　　4 Sheets-Sheet 1

Inventors
BALTUS BOULOGNE
ANTONIE P. BOULOGNE by Allcutholcombe
atty.

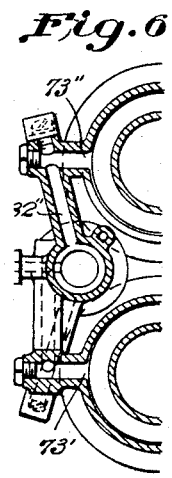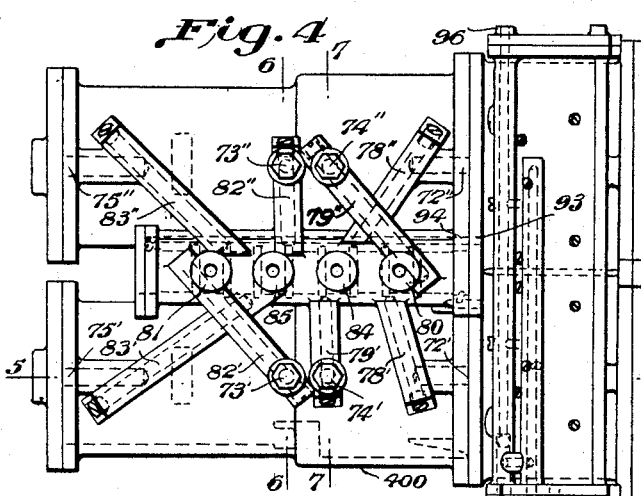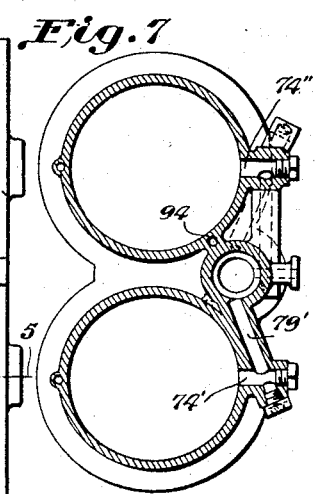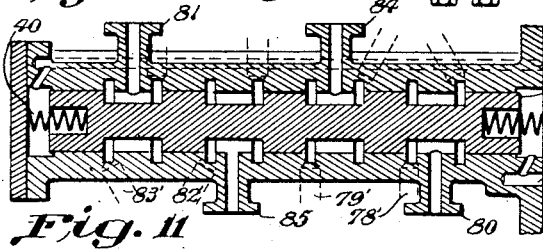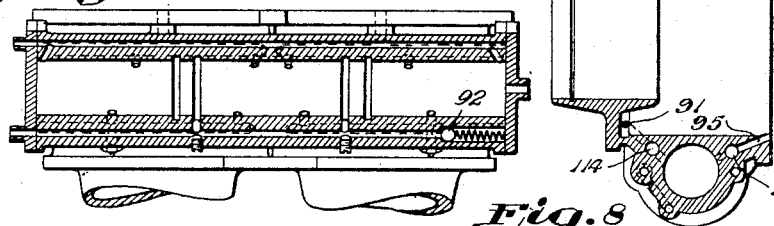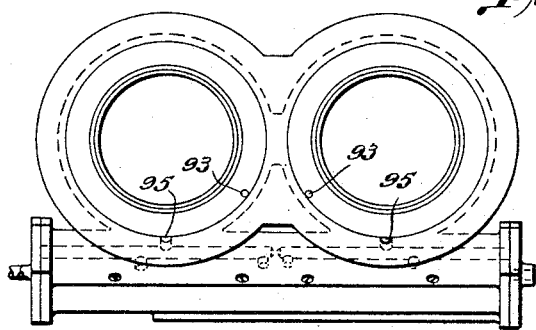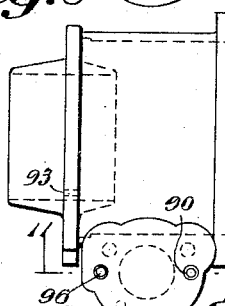

Jan. 11, 1944.   B. BOULOGNE ET AL   2,338,897
MEANS FOR REDUCING THE SLANTING TO SIDES
OF PNEUMATICALLY SUPPORTED VEHICLES
Filed Oct. 12, 1940    4 Sheets-Sheet 3
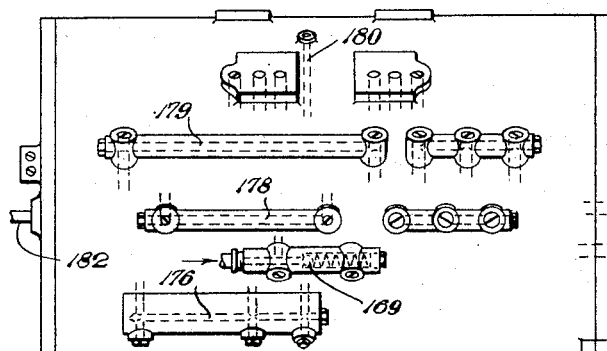
Fig. 14
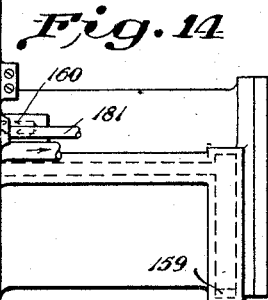
Fig. 15
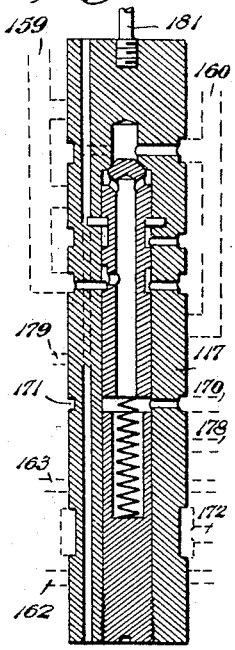
Fig. 30
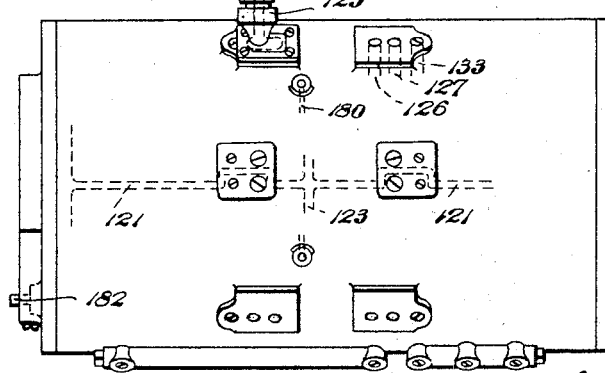
Fig. 16
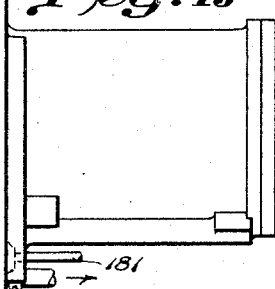
Fig. 31
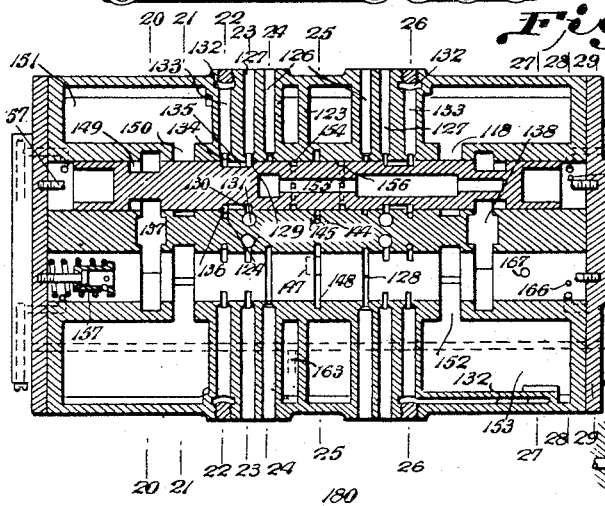
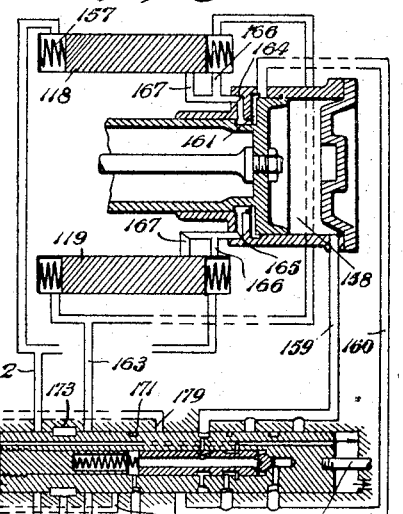
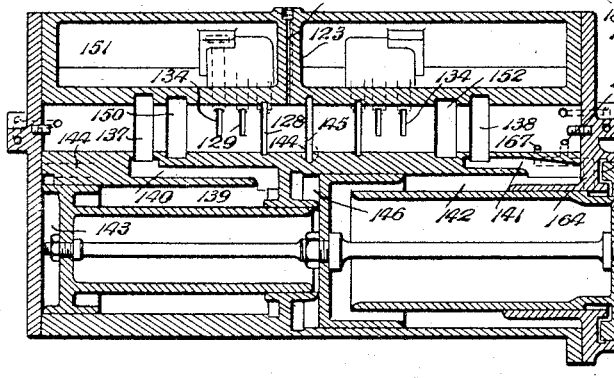
Fig. 17
Inventors
BALTUS BOULOGNE
ANTONIE P. BOULOGNE
by
[signature]
atty.

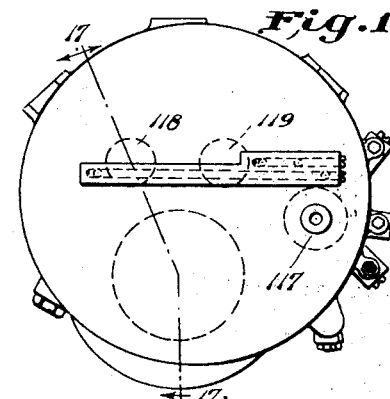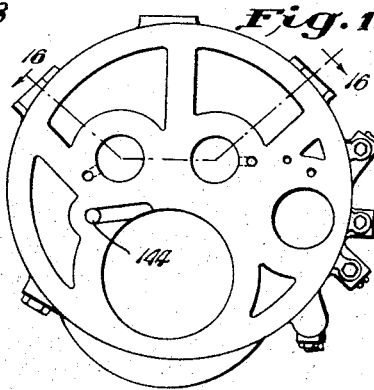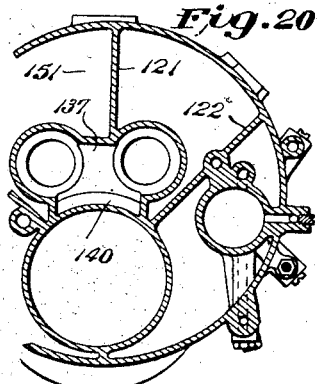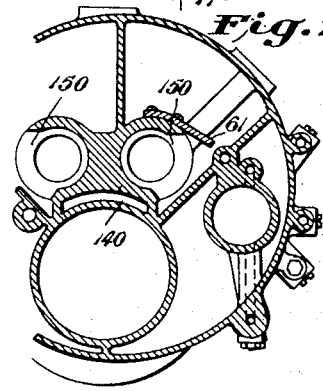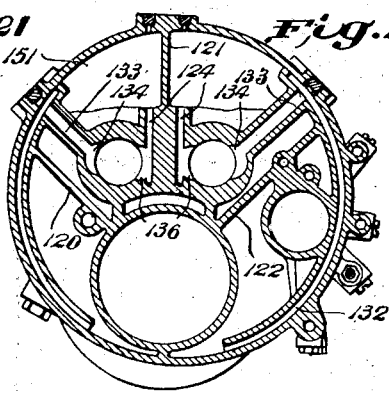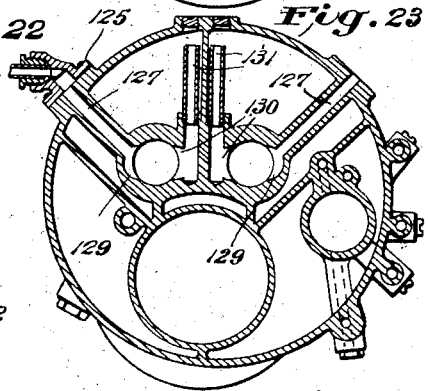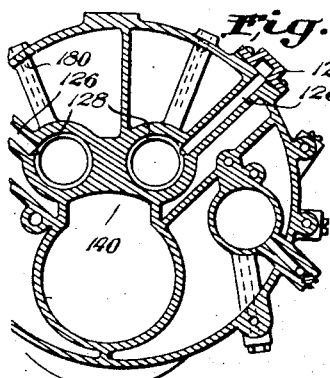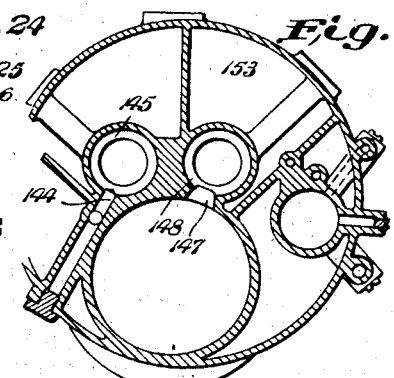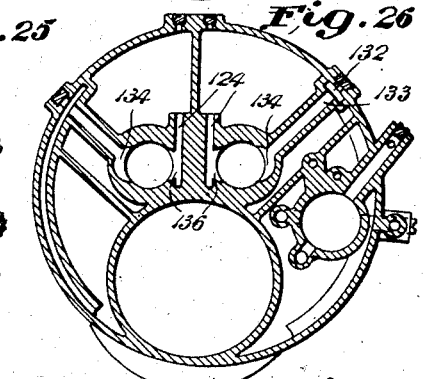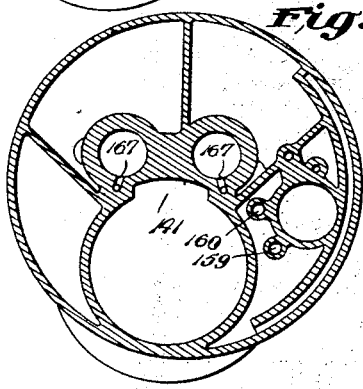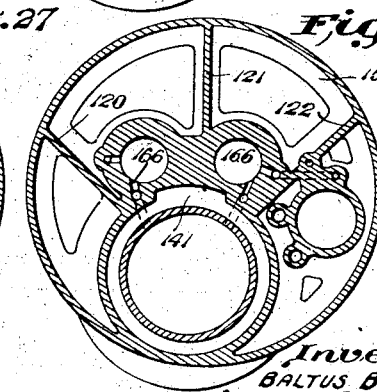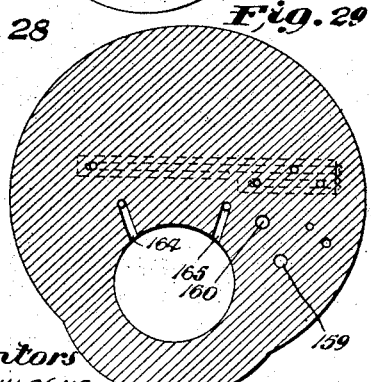
Inventors
BALTUS BOULOGNE
ANTONIE P. BOULOGNE Patented Jan. 11, 1944

2,338,897

UNITED STATES PATENT OFFICE 2,338,897

MEANS FOR REDUCING THE SLANTING TO A SIDE OF PNEUMATICALLY SUPPORTED VEHICLES

Baltus Boulogne and Antonie Pieter Boulogne, Pengalengan, near Bandoeng, Java, Netherland East Indies; vested in the Alien Property Custodian Application October 12, 1940, Serial No. 361,008 In the Netherlands May 9, 1940

6 Claims. (Cl. 267—11)

This invention relates to an apparatus for reducing vehicle side sway.

When an automobile or other vehicle is supported by highly resilient pneumatic shock absorbers, either instead of or in addition to steel springs, it will as a consequence of the strong centrifugal force when driving fast in a curve, slant to a side. Thereby the pressure in the air cushion or cushions, which support that side of the car on the outer side of the curve, will be automatically increased, while for the same reason the pressure decreases in the air cushion or cushions supporting the other side of the car.

According to the invention, an improvement can be effected here if, when taking a quick turn to the left, the air pressure is in some other way increased in one or more air cushions supporting the right side of the car (or part thereof), and at the same time the pressure in one or more cushions which support the left side of the car (or part thereof) is decreased thus preventing slant to a side of the vehicle. When taking a turn to the right said pressure alteration must be reversed. Besides this alteration of pressure, one or more stabilizer bars and/or other devices may be used.

One of the objects of the present invention is to provide devices that will automatically reduce this lateral tilting or side sway under these conditions.

Further objects of the invention are to provide a device for this purpose which will be durable and of simple construction, which will be effective in operation, which will operate upon turning movement of the vehicle in either direction, and which will promptly return to normal condition upon completion of the turning movement.

Still further objects will be apparent from the following specification and by reference to the accompanying drawings, in which:

Fig. 4 is a bottom plan view of the cylinder casings shown in Fig. 3;

Fig. 5 is a view in vertical section taken on line 5—5 of Fig. 4;

Fig. 6 is a fragmentary view in vertical transverse section taken on line 6—6 of Fig. 4;

Fig. 7 is a view in vertical transverse section taken on line 7—7 of Fig. 4;

Fig. 8 is a view in lateral elevation of the valve housing connecting the ends of the cylinder casings;

Fig. 9 is a view in central vertical section of the structure shown in Fig. 8;

Fig. 10 is a view in end elevation of the structure shown in Fig. 8;

Fig. 11 is a view in horizontal section taken on the line 11—11 of Fig. 8, the central valve member being removed;

Fig. 12 is an enlarged diagrammatic view in section of the casing members shown in Fig. 11 with the central valve member;

Fig. 13 is an enlarged view in section of the valve member shown in Fig. 11, with its casing shown diagrammatically to facilitate reference to the various channels and ports;

Figs. 14 and 15 are views in side elevation and in plan, respectively, of a structure constituting a second embodiment of pressure regulating means in accordance with the present invention, the details of such structure being further shown in Figs. 16 to 31, inclusive;

Fig. 16 is a view in section taken on the line 16—16 of Fig. 19;

Fig. 17 is a view in section taken on the line 17—17 of Fig. 18;

Fig. 18 is a view in end elevation as seen from the left-hand end of Fig. 14;

Fig. 19 is a view similar to Fig. 18, but with the cover plate removed;

Figs. 20 to 29 are views in vertical section looking toward the right and taken, respectively, on lines 20—20, 21—21, 22—22, 23—23, 24—24, 25—25, 26—26, 27—27, 28—28, 29—29 of Fig. 16.

Fig. 30 is an enlarged view in section of one of the sliding valve members located as shown in Fig. 18, certain of the ports and channels cooperating therewith being shown in dotted lines; and Fig. 31 is a diagrammatic view showing the various sliding valves and their connections.

Fig. 1 shows diagrammatically a typical arrangement for alteration of the pressure in movable walled air-filled containers 1 supporting a car 2, such like containers hereinafter to be called "bearers."

Figure 1:
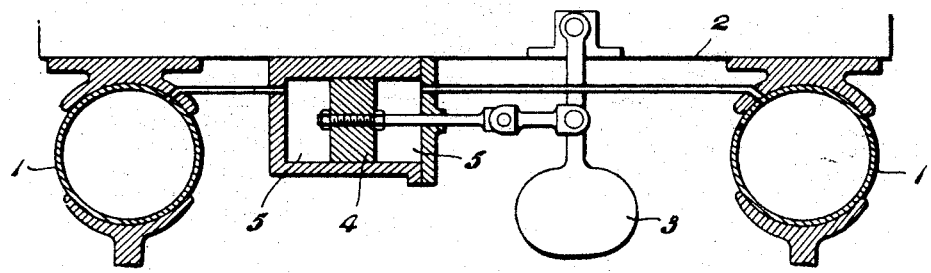
Fig. 1 is a view in lateral cross section of a vehicle illustrating schematically the principle of operation of side sway preventing devices.

When in making a turn centrifugal force acts upon the body 2 of the car, and, consequently, also upon a weight 3 hanging on to it—said weight 3 hereinafter to be called the "slinger"—a piston 4 is moved by this slinger, thus reducing the volume of one of the cylinder chambers 5 and augmenting the volume of the other chamber 5. The part of the cylinder reduced in volume is hereinafter to be called "compression chamber," while the part of the cylinder augmented in volume is hereinafter to be called "suction chamber."

When the piston moves air flows out of the compression chamber into the bearer supporting the car on the outer side of the curve, while some air out of the bearer that supports the car on the inner side of the curve, flows into the suction chamber. When the car comes out of the curve, the slinger 3 and piston 4 again assume their normal positions and the original pressure in the bearers is regained.

Even if the slinger is placed in the front part of the car (to get it to operate quicker), the slinger will not come into action before the body of the car is somewhat under the influence of centrifugal force.

The movement of the piston 4 by a slinger demands so much power that a very large and heavy slinger is needed. It is therefore preferable that said piston is not moved directly by the slinger, but by some arrangement electrically, hydraulically, pneumatically or otherwise operated and activated by a slinger or other means.

If a piston 4 and cylinder, constructed as shown in Fig. 1, be used: while when making a turn sufficient increase in pressure is obtained in the outer bearer (i. e., the bearer on the outer side of the curve), a sufficient decrease in pressure will not yet have been reached in the inner bearer, and consequently the car will still slant over to the outer side of the curve. In order that a sufficient decrease can take place in the inner bearer, the volume of the stroke of the piston decreasing the pressure in the inner bearer can be in a certain proportion to the volume of the stroke increasing the pressure in the outer bearer.

The same result is obtainable if in decreasing the pressure in the inner bearer a part of the air communicating therewith can be shut off in a separate space in such a way that this part of the air cannot expand along with the expanding air of said bearer.

It is also possible when increasing the pressure in the outer bearer to shut off a part of the air communicating therewith in such a way that the pressure of this part of air is not increased.

In order to minimize the size of the equipment, a slight slanting of the car when making a sharp turn at great speed is permissible. Such slanting, however, will only occur in very exceptional cases.

The regulation of the pressure-changes by means of the slinger can be further controlled by a mechanism activated by a possible slanting of the car body in relation to the axles, so that even if the centrifugal force acting thereon keeps the slinger to a side, no further alteration of the pressure in the bearers will take place after the body of the car has regained the desired position with respect to the axles. For this purpose the equipment can be so constructed that the pressure alteration only takes place when and as long as both aforementioned factors—the centrifugal force acting upon the slinger and a slanting of the car body—are present and co-operate for that purpose.

Figure 2:
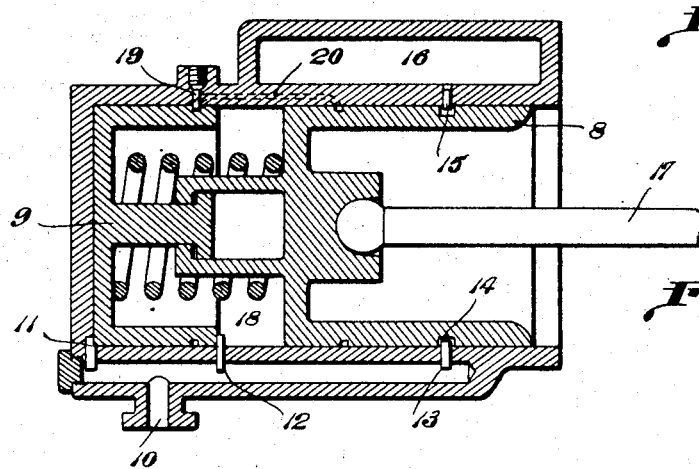
Fig. 2 is a view in vertical longitudinal section of a modified cylinder and piston construction usable in place of the cylinder and piston construction of Fig. 1 for varying the pressure in pneumatic spring devices supporting the sides of the vehicle.

Fig. 2 shows a cylinder wherein two pistons, 8 and 9, are inserted, serving for alteration of the pressure in a bearer connected to tube 10. This bearer, by means of the openings 11 and 12, is in communication with the inner of the cylinder, and further, by means of an opening 13, an annular groove 14 in the piston 8 and an opening 15 in communication with an auxiliary chamber 16. Due to the pressure in the cylinder said piston 8 is pressed against the link 17. When piston 8 is pressed farther into the cylinder by the link 17, only the air in chamber 18, or a part thereof, will be pressed into the bearer through the opening 12 and tube 10, while the air in chamber 16 is not compressed due to opening 15 being then covered by the piston 8. When the link 17, moving in a reversed direction, allows the piston 8 also to move in that direction, piston 9 will follow this movement and thereby cover opening 12, so that no alteration of pressure takes place in the chambers 18 and 16. The air flowing from the bearer through opening 11 will fill up the enlarging space between piston 9 and the cylinder bottom, so that the pressure in the bearer will decrease.

For lubrication and sealing of the pistons oil can be supplied under pressure to an annular groove in the piston, and this can be so arranged that when, for instance, piston 9 moves the channels 19 and 20 are covered.

The volume of the aforementioned air chambers 16 and 18 can be fixed according to any desired degree of suspension resiliency.

Figure 3:
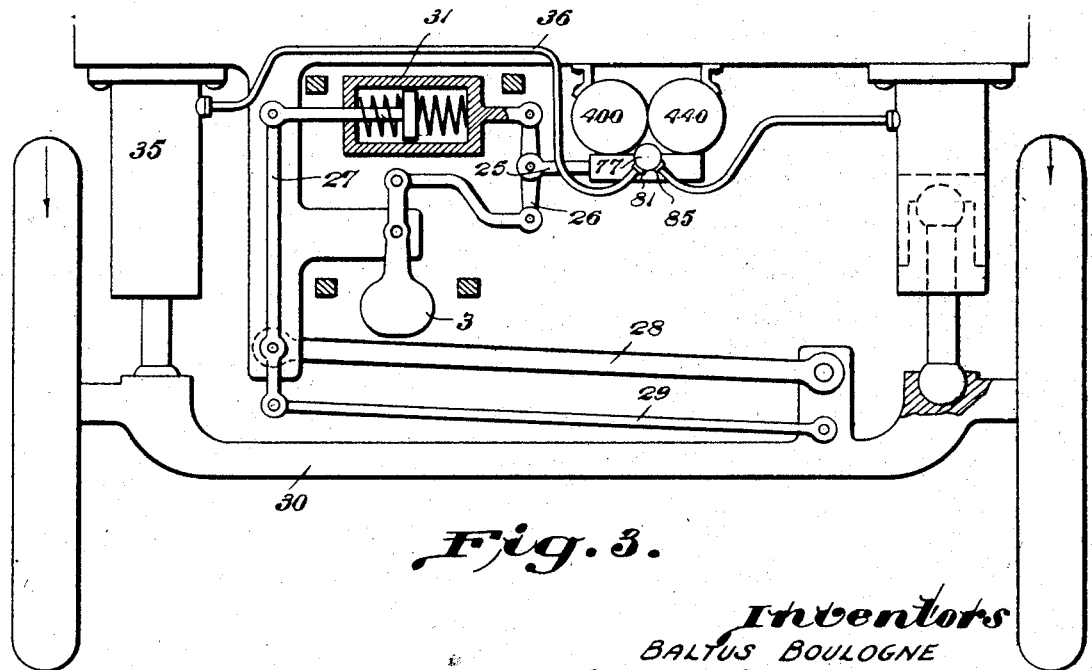
Fig. 3 is a diagrammatic view in lateral section of a vehicle showing an embodiment of the present invention for differentially regulating the pressure in the pneumatic supporting means on one side of the vehicle relatively to those on the other side.

Fig. 3 shows a structure embodying the present invention for regulating of the pressure in four bearers. The apparatus comprises two cylinder casings 400 and 440 with pistons which can be moved by means of compressed air supplied from a reservoir or pump (not shown). The sliding valve 25 regulates the admission and discharge of compressed air serving for displacement of the pistons. When under influence of centrifugal force the slinger 3 is moved to a side, the sliding valve 25 is moved by the lever 26. The arm 27 turnably connected to the body of the car is by means of the rods 28 and 29 connected to a axle 30 of the car, so that when the body of the car slants to a side in relation to the axle 30, the arm 27 changes its position in relation to the body of the car. Consequently when the body of the car slants to a side the arm 27 will by means of the spring device 31 and the lever 26 displace the sliding valve 25.

When in making a turn the pistons in one of the cylinder casings (400 or 440) are moved to alter the pressure in the four bearers, a sliding valve 77 cuts off communication between these bearers and the other cylinder casing.

The dimensions of the piston surfaces and of the compression and suction chambers have here been so fixed in relation to each other that an increase of the pressure in the outer bearers can take place in the proper proportion to the decrease of the pressure in the inner bearers.

Material for lubrication and sealing of the pistons, can be tapped off from the lower part of a compressed air reservoir and led into an annular groove 56 through a channel 55 Fig. 5, whence a channel 57 leads it on to other annular grooves. When said pistons move the channels 55 and 57 are covered, so that an excess of lubricating material cannot flow into the cylinders.

The chambers 74', 74'', 75', and 75'', Figs. 4, 5 and 7, are suction chambers.

The chambers 72', 72'', 73' and 73'', Figs. 4 and 5, are compression chambers.

The pistons 69 and 70 are hollow, and the spaces therein communicate with the compression chambers 72' and 73', respectively, through the orifices 71 when these pistons are in their resting position, as drawn. As soon as the pistons are moved said orifices are covered by the cylinder wall, so that the air in the hollow pistons is not compressed and only the air in the compression chambers, or a part thereof, is pressed into the bearers.

Compression chamber 73' of cylinder casing 400, communicates with the suction chamber 75'' of cylinder casing 440 via canal 82', sliding valve 77 and canal 83''.

The bearer 35 supporting the right side of the car, being connected to the flange 81 of the sliding valve housing, is thus in communication with the compression chamber 73' of 400 and with the air in the hollow piston 70, as well as with the air in the suction chamber 75'' of 440. Another bearer, also supporting the right side of the car, is connected to flange 80 of the sliding valve housing, and communicates with the other compression chamber 72' in 400 through canal 78' and with the other suction chamber 74'' in 440 through canal 78''. The bearers supporting the left side of the car are connected to the flanges 84 and 85.

Fig. 12 being on an enlarged scale makes clear the above description.

As long as no alteration of the pressure in the bearers is desired, air pressure must be maintained in the chambers 76 to keep the pistons in their resting position while the chambers 86 are under atmospheric pressure.

When making a turn to the right, the air pressure extending in chamber 76 of cylinder casing 440 must be discharged and compressed air must be led into chamber 86 of the same cylinder casing. This air flowing through opening 93 and canal 94 enters into space 40 and will by moving of the sliding valve 77 shut off the canals 78', 79', 82' and 83', so that the communications with cylinder casing 400 are cut off.

The air admitted into chamber 86 of cylinder casing 440 will displace the pistons inserted in this cylinder casing and causes enlarging of the suction chamber 75''. A part of the air present in the right bearer 35 then flows through pipe 36 out of the bearer 35 into said suction chamber 75'' so that the pressure in the right bearer 35 is decreased.

At the same time the pressure in the other right bearer too must be decreased and for that purpose this bearer is connected to flange 80 and communicates with suction chamber 74'' through canal 78''.

Each of the bearers supporting the left side of the car is connected to one of the flanges 84 and 85.

In making a turn to the left, the pistons in the cylinder casing 400 move, and communication is cut off between the bearers and the cylinder casing 440.

When driving straight ahead the sliding valve 77 is in its middle position, so that each of the four bearers is in communication with a compression chamber of one cylinder casing, and with a suction chamber of the other cylinder casing, thus the air cushion of each bearer is in communication with the air in one compression chamber and the air in one hollow piston of one cylinder casing, and also with the air in one suction chamber of the other cylinder casing.

When the pistons in the cylinder casing 400 move, a pressure decrease takes place in the two separate suction chambers 74' and 75' of this cylinder casing, while in the two separate compression chambers 72' and 73' of this cylinder casing a pressure increase takes place. The compression chambers then remain in communication with the bearers on the outer side of the curve, while the suction chambers remain in communication with the inner bearers.

Instead of in sliding valves (such as 77) grooves, excavations or the like may be made in the pistons for cutting off and reestablishing communications by displacements of the pistons.

The pistons are kept in their resting position by pressure in chamber 76. When chamber 76 is put in communication with chamber 86, so that a part of the air from the former (76) flows over into the latter (86), the pistons move a part of their way. For the purpose of bringing the pistons to the end of their stroke, it is however necessary that the air from 76 be discharged and new compressed air be supplied to chamber 86.

To bring the pistons back to their resting position, the sliding valve 25 by again bringing 86 into communication with 76, in a similar way allows a part of the compressed air to flow out of 86 into 76 and thus co-operate to move the piston. This method reduces the consumption of compressed air. To make possible this flow over of air there are built into the sliding valve 25 two bodies 88, each of which is partly a sliding valve and partly an ordinary valve.

In Fig. 13 one of these bodies 88 is shown in view with the ordinary valve closed, and the other in section with the ordinary valve open.

If in making a turn the centrifugal force makes this desirable, the sliding valve 25 is so moved that those pistons are displaced which are able to increase the pressure in the bearers supporting the car on the outer side of the curve.

The canals 95 serve for admission and discharge of compressed air to and from the chambers 76, while the canal 96 serves for the supply of compressed air from, for instance, a reservoir. This arrangement operates as follows: When the sliding valve 25 is in the middle position chambers 76 are under pressure and the pistons are thereby kept in their resting position. In order to avoid unnecessary consumption of compressed air and to allow only sufficient air to pass into chamber 76 (to keep the pistons in their resting position) air is tapped off from canal 96 by means of a pressure reduction valve 92 and led into a canal 97. The pressure in said canal 97 is thus lower than that in 96 and this canal 97 is in communication with the canals 98 in the sliding valve 25 when the pistons are in the resting position (middle position of 25). Each canal 98 always remains in communication with a wide groove 99 in 88, which groove, when the ordinary valve of 88 rests against its seat, communicates with a groove 100 in the sliding valve 25. Groove 100 in communication with a canal 101 in the sliding valve 25. When the sliding valve 25 is in its middle position canal 101 is in communication with chamber 76 through a groove 102 and the canals 103 and 95, so that the air in both chambers 76 is of the pressure as reduced by 92. This same pressure is then also present in the canals 104 and 105, and the two bodies 88 in the sliding valve 25 are then in such a position, due to action of their springs, that their ordinary valves are closed.

When now in making a turn the sliding valve 25 is sufficiently displaced, one of the canals 103 is covered by it, so that the pressure in the chamber 76 which communicates with that canal remains unchanged. While at the other end of the sliding valve 25 the groove 113 comes into communication with the canal 91, so that the air pressure extending in space 60 will escape out of this space into chamber 86. At the same time the canal 105 has come into communication with the space 116 bordering on the valve of 88 the pressure of air coming from 105 into 116 opens this valve and the compressed air will flow out of chamber 76 through 95, 104, 105, 116, 101, 113 and 91 into chamber 86. During this overflow the canal 107 is covered by the body 88 so that during that time no air is discharged out of chamber 76 through 95, 103, 106, 107 and 109. Also the groove 108 being covered by the body 88 during this overflow no air supply can take place from canal 96 through 112, 98, 99 and 100 into chamber 86, but as soon as the pressure in chambers 76 and 86 has become about equal the ordinary valve of 88 will be closed by its spring, and air supply can take place from 96 through 112, 98, 99, 100, 101, 113 and 91 into chamber 86, at the same time discharge of air can take place out of chamber 76 through 95, 103, 106, 107, 108, 109, 110, 111 and 90. Thus pressure is built up in chamber 86 and the air is flowing out of chamber 76 so that the pistons move and the pressure in the bearers is altering.

As soon as sufficient alteration of pressure is obtained in the bearers and the sliding valve 25 is moved back somewhat, no further entry or exit of air in the chambers 76 and 86 takes place, and the pressure reached in the bearers is thus retained until the position of the sliding valve is altered.

When the groove 113 is in contact with the canal 91 the pressure extending in 91 is also present in the canals 114 and 115, the latter being then shut off by the sliding valve 25. When the sliding valve 25 returns to its middle position due to the car coming out of the curve, canal 115, which connects with chamber 86, is brought into contact with the space 116 bordering on the valve of 88, so that the air pressing in this space opens this valve. The space 116 being brought somewhat earlier into communication with canal 115, and 102 with 103, than groove 106 comes into contact with canal 91, the latter connection takes place when valve 88 has already been moved (in 25), and covers canal 107 and groove 100. The ordinary valve of body 88 opened by the pressure in space 116 allows compressed air to pass from chamber 86 through 91, 114, 115 and 116 into canal 101 and thence through the groove 102, through 103 and 95 into chamber 76.

Inasmuch as 88 when its valve is opened covers the groove 100 (thus pressure cannot flow from 98 into 101 and space 60), this valve will be closed by its spring only when the pressure in the chambers 86 and 76 is approximately the same. By the closing of this valve the groove 100 comes into communication with the wide groove 99 and new compressed air flowing through 96, 97, 98, 99, 100, 101, 102, 103 and 95 enters 76, the while reduction valve 92 limits the pressure.

At the same time by closing of the valve of body 88 the groove 108 connects the canal 107 to the canal 109 so that discharge from chamber 86 takes place through 91, 107, 108, 109, 110, 111 and 90.

When under the influence of centrifugal force the slinger 3 is moved to a side, the sliding valve 25 is moved by the lever 26, but since the movement of the slinger is limited to fixed points, the displacement of valve 25 is still insufficient to cause a pressure alteration, but as soon as arm 27 changes position due to a commencement of slanting of the car body with respect to the axle, the sliding valve 25 consequently moves a little further and alteration of pressure will take place causing the car to regain its correct position with respect to the axle. The arm 27 then returns to its original position and the sliding valve again moves back to the position where no or no further pressure alteration in the bearers takes place and the car body remains in the desired position. Thereafter, as soon as the car comes out of the curve, the slinger returns to its original position, the sliding valve goes back to its middle position and the original pressure in the bearers will be regained. The arm 27 is connected to the lever 26 by an interposed spring device and the movement of this is also limited to fixed points.

In order to make easy the displacements of the sliding valve 25 and body 88, a plurality of canals 98 and 107 are made in the circumference of the sliding valve 25.

In the modified arrangement and structure shown in Figs. 14 to 31 only one cylinder casing is utilized in which the pistons are moved. When centrifugal force acting upon the slinger from left to right displaces the sliding valve 117 (to move the pistons), each of the sliding valves 118 and 119 will be moved in a certain direction, and when the sliding valve 117 is displaced in a reversed direction, the movement of the sliding valves 118 and 119 is also reversed.

In making a turn, whether to the right or to the left, the bearers will, by means of the sliding valves 118 and 119, be so connected that the outer bearers are in communication with the compression chambers, while the inner bearers communicate with the suction chambers.

In order to prevent a part of the air from the bearers from remaining in the cylinder casing when the connections to the bearers are changed, the compression and suction chambers in the cylinder casing are filled with oil. If a pressure increase is desired in one of the bearers, oil coming out of a compression chamber is led into a compartment communicating with the air cushion of such bearer, whereby the pressure in the bearer increases. When driving in curves the oil fillings in the cylinder casing prevent air from being brought over from one bearer to another. The space between the tubular housing wherein the cylinder casing is located and this cylinder casing is divided into four compartments by the walls 120, 121 and 122, while a wall 123 across these compartments divides each of them in two, thus forming eight air compartments. When driving straight ahead, two such compartments, one lying above the other, are in communication with each bearer, so that the compressed air in these compartments increases the resiliency of the air cushions supporting the car. The quantity of oil used is such that when the pistons are in their resting position (as shown in Fig. 17) not alone is the cylinder casing quite full, but each of the four upper compartments is also filled to such an extent that the sliding valves 118 and 119 and the canals 124 adjoining them remain below the level of the oil (as shown in Fig. 22). Each of the four bearers is connected to a canal 126 and a canal 127 by means of a flange 125 which has an excavation in it for the purpose of communication.

By means of canals 126 each of the bearers is in communication with one of the grooves 128 in the housings of the sliding valves 118 and 119, while, furthermore, the bearers individually are connected by means of a canal 127 with one of the excavations 129. Opposite these excavations in the housings of the sliding valves similar excavations 130 are located, each of which is connected to a pipe 131. When the pistons are in their resting position the canal 132 is in communication with the canal 124 by means of the canal 133, this canal 133 being at that moment connected by the excavation 134 and the wide groove 135 with the oppositely located excavation 136. Consequently, 132, 133, 134, 135, 136 and 124 connect an upper compartment with one below. Furthermore, inasmuch as (with the piston in the resting position) the wide groove 135 connects the excavations 129, 130, 134 and 136 to each other, the canal 132 and the canal 135 are connected with the pipe 131 and the canal 127. Consequently, along that path too an upper and a lower compartment communicate with each other, and by means of a flange 125 on canal 127 are connected to one of the bearers. The air flowing back and forth through these canals will bring any oil which may have accumulated in the lower compartment back to the upper compartment. Thus there will be practically no oil in the lower compartments, and with the pistons in the resting position each of these connect with the compartment above it. Each of these compartments is then connected by means of a pipe 131, an excavation 130, a wide groove 135, an excavation 129, a canal 127 and a flange 125 to one of the bearers. When the pistons are in their resting position, as shown in Fig. 17, the sliding valves 118 and 119 being in their middle position keep the ports 137 and 138 closed. Either before or at the same time as the pistons are moved, both sliding valves 118 and 119 are displaced to the full extent of their stroke in opposite directions to each other.

By means of a canal 140 the port 137 is connected to the compression chamber 139 in order to allow oil to flow from said compression chamber into one of the upper compartments (so as to increase the pressure in one of the bearers) when the sliding valves 118 and 119 are moved from their middle position. A canal 141 connects the port 138 to the compression chamber 142, so that at the same time oil can flow from this compression chamber to another upper compartment.

The suction chamber 143 of the cylinder casing, by means of a canal 144, is in communication with a groove 145 located in the housing of sliding valve 118, while the suction chamber 146 is provided with an excavation 147 (Fig. 25) which connects with the groove 148 in the housing of sliding valve 119. When the sliding valves 118 and 119 are in their middle positions, the compression chambers of the cylinder casing, as well as the suction chambers, do not communicate with any of the compartments or bearers.

When by the action of the slinger the sliding valve 117 moves in a certain direction and the sliding valve 118 goes to the right and the pistons move, the wide annular groove 149 in this latter sliding valve then connects the port 137 with the port 150, so that oil from the compression chamber 139 is pressed through 140, 137, 149 and 150 into the upper compartment 151. The pressure in this compartment is thereby increased and consequently the pressure in the outer bearer communicating therewith through 131, 130, 135, 129, 127 and 125 will also increase.

At the same time, the other sliding valve (119) being displaced to the left, oil is pressed from compression chamber 142 through 141, 138 and 152 into the upper compartment 153, whereby the pressure in the bearer connected to this compartment 153 is increased.

The displacement of sliding valve 118 to the right, as already mentioned, causes connection to be made between a groove 154 in said sliding valve and a groove 145 (which is connected by the canal 144 to the suction chamber 143). By means of space 155, which connects with grooves 154 and 156, the groove 154 is brought into connection with one of the canals 126. Communication is thus established between 143 and said canal 126, and the pressure decrease taking place in 143 causes also a decrease in pressure in the inner bearer connected to that canal (126) by means of one of the flanges 125 (not shown here). The canal 127 (which is connected by means of a flange 125 with aforementioned canal 126) being closed by the sliding valve 118, the decrease of pressure in the suction chamber 143 cannot cause a pressure decrease in a upper compartment, so that the decrease of pressure caused in the suction chamber 143 is confined solely to an inner bearer, said suction chamber and bearer being in communication with each other through 144, 145, 154, 155, 156, 126 and a flange 125.

In a similar manner, the suction chamber 146 which communicates with the fourth bearer by means of 147 and 148 and through the hollow of the other sliding valve (119) causes a pressure decrease in that bearer. Consequently, when the pistons are displaced from their resting position the pressure in two of the bearers increases and that in the other two decreases, while depending upon the direction in which the sliding valve 117 is displaced (to bring the pistons into action) the displacement of sliding valves 118 and 119 takes place either to the right and left, or to the left and right.

In order that the sliding valves 118 and 119 be kept exactly in their mean position when driving straight ahead, and to prevent shocks, the spring devices 157 are included which are provided with small air cushions.

When the pistons are in their resting position and the sliding valve 117 is in its middle position, the chamber 158 is always under such pressure that the pistons are kept in the position as shown.

Activated, for instance, by a slinger, the sliding valve 117 operates in approximately the same manner as the sliding valve of Fig. 13. This sliding valve 117 (Fig. 31) regulates the passage of compressed air to and from chambers 158 and 161 through 159 and 160, respectively. According as the car turns to the right or to the left, sliding valve 117 admits compressed air into canal 162 or canal 163, whereby the sliding valves 118 and 119 then attain such a position that the bearers are brought into communication properly with the compression and suction chambers in the cylinder casing as required for the direction of the turn.

When after its displacement the sliding valve 117 returns to its middle position, the canals 162 and 163 are covered by it and no air can flow back; thus the sliding valves 118 and 119 are not yet able to return to their middle position, but activated by the spring device 157 they will do so as soon as the pistons again attain their resting position because the canals 164 and 165 are then uncovered and communicate with the chamber 161 from which discharge takes place. The compression chambers 139 and 142 are then again entirely filled up with oil.

In order to obtain quick displacement of the sliding valves 118 and 119, the canals 162 and 163, which admit compressed air, are in comparison with the channels 166 of larger cross section, so that only a small part of the air supplied through 162 or 163 can escape.

To obtain a quick discharge of the air, which has served for displacement of the sliding valves 118 and 119 a canal 167 is so located that at the commencement of the discharge the outflowing air meets with practically no resistance.

In order that the two factors previously mentioned—centrifugal force and the commencement of slanting to a side—may co-operate with each other in the alteration of the pressure in the bearers, a second slide valve member 168 is included in the housing of sliding valve 117. The sliding valve 117 is moved by the slinger 3 and sliding valve 168 is activated by the slant to a side of the body of the car.

To keep the pistons in their resting position when driving straight ahead compressed air is brought to the required pressure by a reduction valve 169, and through a canal 170 and a groove 171 led into the sliding valve 117 and further into chamber 158 through canal 159, while compressed air (not reduced in pressure) reaches a wide groove 173 in this sliding valve 117 through a canal 172. When 117 moves to the right or to the left, said compressed air will flow from 173 into 162 or 163 and reach the groove 177 in sliding valve 168 through 174 or 175 and through 176.

If now the aforesaid factors—centrifugal force and slanting to a side—cooperate, so that the two valves 117 and 168 are displaced towards each other and the air supply through 170 and 171 is thereby cut off, compressed air (not reduced in pressure) from 172 will, through 173, 174, 176, 177 and 178, reach the groove 171, and thence through the inner spaces of the sliding valve 117 and through canal 160 flow into chamber 161.

The air supply through 170 and 171 is also cut off if due to the aforesaid factors the two valves 117 and 168 be displaced away from each other, in which case compressed air (not reduced in pressure) will reach the groove 171 through 173, 175, 176, 177 and 179, and thence flow into chamber 161 through canal 160.

As soon thereafter as one of the co-operating factors already referred to ceases to exist, so that one of the sliding valves 117 or 168 has returned near to its middle position, the aforementioned supply of compressed air is cut off.

If in making a sharp turn when driving fast adequate alteration of pressure has taken place in the bearers, the car will, when for instance its speed is reduced, begin to slant towards the inner side of the curve. Sliding valve 168 will then be moved towards the side opposite to that in which it cooperates with the sliding valve 117 which is displaced by the slinger. Sliding valve 168 will in that position, without necessitating any change in the position of 117, then allow the air flowing back from chamber 161 to escape through the sliding valve 117 and one of the canals 178 or 179 until the alteration in pressure is reduced in extent as required.

In order that such escape of air may take place gradually and not suddenly, the ends of the canals 178 and 179, near the valve 168, are of a special shape.

In order that a sufficient quantity of oil can always be maintained in the cylinder casing and in the compartments above it, the spaces 155 in the hollow sliding valves 118 and 119 can be of large volume and function as follows: When the sliding valves 118 and 119 are in the middle position, a channel 180, through which oil is supplied under pressure, communicates with the groove 154 which groove is in communication with the space 155. Each time the sliding valve is in the middle position the compressed air in space 155 is thus further compressed by the oil flowing from canal 180, so that said space 155 is partly filled with oil, and when alternately making turns to the right and to the left, this oil, when repeatedly flowing out of the spaces 155 of sliding valves 118 and 119, is divided between the four upper compartments. Any excess of oil reaching these compartments will escape into the bearers and from there be discharged.

Canals and ports from which oil flows out of the cylinder casing into the air compartments and back can in different ways be so shaped and located that no air bubbles are conveyed along with the oil flowing back into the cylinder casing, and to prevent such conveyance of air, the upper compartments are provided with fences 61 (drawn in Fig. 20).

Instead of a slinger and an arm 27, as described in the foregoing, other devices operating under centrifugal force as, for instance, one or more rollers or balls moving along a fixed path, or a liquid such as, for example, mercury, can be used to activate the equipment serving for alteration of the pressure in the bearers.

It is also evident that various changes, modifications, variations and substitutions might be resorted to without departing from the spirit and scope of the invention.

I claim:

1. In a vehicle provided with suspension means comprising expansible shock absorber chambers, the combination of a regulator effective to vary the effective volume of said shock absorber chambers comprising cylinders each having therein a pair of pistons having a lost motion connection therebetween, said pistons and cylinder defining an auxiliary chamber normally connected to its respective shock absorber chamber, means for moving said pistons in unison in one direction and connections controlled by one of said pistons to control communication between said auxiliary chamber and its respective shock absorber chamber.

2. In a vehicle provided with suspension means comprising expansible shock absorber chambers, the combination of cylinders each cooperating respectively with one of said shock absorbers and containing two pistons having a lost motion connection therebetween whereby they move in unison in one direction but the first of said pistons can move in the other direction independently of motion of the second piston, said cylinder and pistons defining a first auxiliary chamber between said pistons and a second auxiliary chamber between the end of one piston and the end of the cylinder, connections between said first auxiliary chamber and its respective shock absorber chamber controlled by the position of said second piston, and means for moving said pistons.

3. In a vehicle provided with suspension means comprising shock absorbers each having a chamber therein with a movable wall and containing a fluid under pressure, the combination of a regulating device operable to alter the effectiveness of said shock absorbers comprising a pair of cylinders each having therein a pair of pistons, said cylinders and pistons defining compression chambers and suction chambers, valve means and connections controlled by said valve means to control communication between a suction chamber of one cylinder and a compression chamber of the other cylinder and to establish and cut off communication from the compression chambers and suction chambers to said shock absorber chambers.

4. In a vehicle provided with suspension means comprising shock absorbers each having a chamber therein with a movable wall and containing a fluid under pressure, the combination of a regulating device operable to alter the effectiveness of said shock absorbers, comprising a cylinder casing having therein a plurality of pistons defining with said cylinder casing and with each other a plurality of auxiliary compression and suction chambers, conduits connecting said shock absorber chambers to various of said cylinder casing chambers, said connections being subject to control by movement of said pistons to establish and cut off communication between various of said suction chambers and said shock absorber chambers and between various of said compression chambers and said shock absorber chambers, and means for moving said pistons.

5. In a vehicle provided with suspension means comprising shock absorbers each having a chamber therein with a movable wall and containing a fluid under pressure, the combination of a regulating device operable to alter the effectiveness of each of said shock absorbers in supporting said vehicle to minimize tilting of said vehicle when turning, comprising a cylinder casing having therein a plurality of pistons defining with said cylinder casing and with each other a plurality of suction chambers and compression chambers, conduits normally connecting said shock absorber chambers to various of said suction chambers and compression chambers, said suction chambers and compression chambers being filled with liquid when said vehicle is moving in a straight path, means operable by movement of said pistons to vary the connections from said shock absorber chambers to said suction chambers and compression chambers, and means operable to move said pistons when said vehicle turns from a straight path.

6. In a vehicle provided with suspension means comprising shock absorbers each having a chamber therein with a movable wall and containing a fluid under pressure, the combination of a regulating device operable to alter the effectiveness of said shock absorbers, comprising a structure having therein a plurality of auxiliary chambers, certain of said auxiliary chambers being normally in communication with various of said shock absorber chambers, means operable to vary the effective volume of said auxiliary chambers, and means operable upon a change in direction of travel of said vehicle to actuate said last-mentioned means and to alter the connections of said chambers to said shock absorber chambers.

BALTUS BOULOGNE.
ANTONIE PIETER BOULOGNE.